US007937712B2

(12) United States Patent
Rapp et al.

(10) Patent No.: US 7,937,712 B2
(45) Date of Patent: May 3, 2011

(54) SYSTEMS AND METHODS FOR PROVIDING A GENERIC AUDIT TRAIL SERVICE

(75) Inventors: Roman Rapp, Villeneuve Loubet (FR); Julien Delvat, Antibes Juan les Pins (FR)

(73) Assignee: SAP AG, Walldorf (DE)

(*) Notice: Subject to any disclaimer, the term of this patent is extended or adjusted under 35 U.S.C. 154(b) by 1288 days.

(21) Appl. No.: 11/508,227

(22) Filed: Aug. 23, 2006

(65) Prior Publication Data

US 2007/0256084 A1 Nov. 1, 2007

(30) Foreign Application Priority Data

Apr. 28, 2006 (EP) .................................. 06290711

(51) Int. Cl.
G06F 3/00 (2006.01)
G06F 9/44 (2006.01)
G06F 9/46 (2006.01)
G06F 13/00 (2006.01)

(52) U.S. Cl. .................... 719/316; 719/318; 719/320

(58) Field of Classification Search .............. 709/224; 705/29; 707/204; 719/316, 320
See application file for complete search history.

(56) References Cited

U.S. PATENT DOCUMENTS

| | | | |
|---|---|---|---|
| 6,286,030 B1 | 9/2001 | Wenig et al. | |
| 6,407,761 B1 | 6/2002 | Ching et al. | |
| 7,085,739 B1 * | 8/2006 | Winter et al. | 705/37 |
| 7,103,609 B2 * | 9/2006 | Elder et al. | 707/102 |
| 7,574,501 B2 * | 8/2009 | Louie et al. | 709/224 |
| 2002/0032640 A1 | 3/2002 | LaFore et al. | |
| 2003/0220852 A1 * | 11/2003 | Back et al. | 705/29 |
| 2005/0165668 A1 | 7/2005 | Hinkle | |
| 2008/0072240 A1 * | 3/2008 | Gschiermeister et al. | 719/316 |

FOREIGN PATENT DOCUMENTS

WO WO 96/23258 8/1996
WO WO 02/44888 A1 6/2002

OTHER PUBLICATIONS

Kurata, Use Generics to Create an Audit Trail, DEVX, 2004, pp. 1-15.*
Gregoriades et al, Unifying business objects and systems dynamics as a paradigm for developing decision support systems, Elsevier B.V., 2003, pp. 307-311.*

(Continued)

Primary Examiner — Diem K Cao
(74) Attorney, Agent, or Firm — Finnegan, Henderson, Farabow, Garrett & Dunner, L.L.P.

(57) ABSTRACT

Systems, methods, and computer readable media are disclosed for providing a generic audit trail service for a plurality of business objects, at least two of the plurality of business objects being of different business object types. In one implementation, a computer-implemented method is provided that comprises receiving, at an application server, a notification of a change associated with at least one of the plurality of business objects, and requesting, in response to receiving the notification, auditing data from the at least one business object, the at least one business object implementing an auditable function set to interface with the application server. Further, the method includes receiving, through a called method of the auditable function set, the requested auditing data, and storing the received auditing data in a repository.

18 Claims, 6 Drawing Sheets

OTHER PUBLICATIONS

European Communication and Search Report, dated Jul. 21, 2006 (6 pages).

Summons to Attend Oral Proceedings, issued by European Patent Office on Aug. 11, 2010, in a counterpart European application No. 06 290 711.8, 6 pages.

Thomas Minka, Observer Pattern, Jan. 23, 1997, pp. 1-3, Retrieved from the Internet URL:http://alumnLmedia.mit.edu/-tpminka/patterns/Observer.html [retrieved on Jul. 21, 2010].

E. Gamma, Design patterns, Oct. 13, 1997, Addison-Wesley, pp. 13-18 and 293-303.

\* cited by examiner

SYSTEMS AND METHODS FOR PROVIDING A GENERIC AUDIT TRAIL SERVICE

TECHNICAL FIELD

The present invention generally relates to data logging and, more particularly, to systems and methods for providing generic audit trail services.

BACKGROUND

There is, and will continue to be, advances and changes in how organizations conduct business. Whether these advances and changes occur through growing competition and globalization, mergers and acquisition, or a revamping of business models, the key for success will often depend on how quickly an enterprise's information technology (IT) organization can adapt to evolving business needs. Therefore, a major challenge to these enterprises is how they handle change.

For organizations to maintain business agility, they must ensure that enterprise applications are not only high-performance business engines driving efficiencies, but also that they become flexible building blocks of future business systems. A recent and promising solution has risen in the form of services. A service, such as a Web service or program, represents a self-contained and self-describing piece of application functionality that can be found and accessed by other applications. A service can be considered self-contained because the application using the service does not have to depend on anything other than the service itself. A service can be considered self-describing because all the information on how to use the service can be obtained from the service itself. Further, descriptions for a service can be centrally stored and accessible through standard mechanisms.

Instead of requiring programmers to establish and maintain links between applications, services are often loosely coupled, making connections simpler and more flexible and allowing application architects to more easily find and understand services offered by other cooperative applications. However, a problem that exists with conventional services is that they are often designed to expose functionality of individual applications and, thus, are too limited to be efficient building blocks for enterprise-wide business processes. A solution to this shortfall has been the migration to a Service Oriented Architecture (SOA). SOA is an open architecture middleware, which builds on the benefits of services. An example of an SOA can be found in the Enterprise Service Framework (ESF), which is commercially available from SAP AG (Walldorf, Germany). The term "SOA" may also be used to refer to "distributed objects" architecture, such as CORBA (Common Object Request Broker Architecture) and DCOM (Distributed Component Object Model).

SOA enables the abstraction of business objects, modeled as services (also referred to as enterprise services), from actual applications. Aggregating services into business-level enterprise services may provide more meaningful building blocks for the task of automating enterprise-scale business scenarios. Enterprise services may also allow IT organizations to efficiently develop composite applications, which compose functionality and information from existing systems to support new business processes or scenarios.

SOA also enables the use of an enterprise services repository. An enterprise services repository stores relevant pre-existing enterprise services and makes them available to selected partners and customers. By using the enterprise services repository, these selected partners and customers can use the pre-existing enterprise services to aid in the implementation of new services and corresponding business objects. An "object" refers to a software bundle of variables (e.g., data) and related methods. For example, in object-oriented programming, an object is a concrete realization (instance) of a class that consists of data and the operations associated with that data. The term "business object" (BO) represents a physical or logical object of significance to a business, such as a purchase order, GLAccount, production order, project, product cost estimate, etc. BO is one instance of an business object type, wherein the business object type refers to a generic definition of business objects that describes the general characteristics and common attributes.

Frequently, there are many situations where a business should record changes to BOs implemented by partners and customers. For example, an online transaction processing system should record alteration, creation, or deletion of a BO and its transactional data in order to track changes for internal or regulatory reasons, such as for financial audits. Currently, there are different specialized auditing solutions for different BOs. However, in current systems, existing SOAs fail to provide robust and flexible auditing services. Instead, current solutions are specific and cannot be used by any kind of BO in a SOA. In addition, current solutions are costly to design, implement, and maintain. Therefore, there is a need for improved enterprise services to provide a generic audit trail service that can be used by all kinds of BOs.

SUMMARY

Embodiments consistent with the present invention relate to systems, methods, and computer readable media for providing a generic audit trail service. The generic audit trail service may be provided for a plurality of business object types. Embodiments of the invention also relate to systems, methods, and computer readable media for providing auditing services that can alleviate one or more of the above-described disadvantages existing in the related art.

Embodiments consistent with the invention include a computer-implemented method for providing a generic audit trail service for a plurality of business objects, at least two of the plurality of business objects being of different business object types. The method comprises receiving, at an application server, a notification of a change associated with at least one of the plurality of business objects, and requesting, in response to receiving the notification, auditing data from the at least one business object, the at least one business object implementing an auditable function set to interface with the application server. The method also includes receiving, through a called method of the auditable function set, the requested auditing data, and storing the received auditing data in a repository.

Embodiments consistent with the invention also include a system for providing a generic audit trail service for a plurality of business objects, at least two of the plurality of business objects being of different business object types. The system comprises an element for receiving, at an application server, a notification of a change associated with at least one of the plurality of business objects, and an element for requesting, in response to receiving the notification, auditing data from the at least one business object, the at least one business object implementing an auditable function set to interface with the application server. Further, the system includes an element for receiving, through a called method of the auditable function set, the requested auditing data, and an element for storing the received auditing data in a repository.

Embodiments consistent with another aspect of the invention include a computer program product including instructions for execution by a processor to perform a method for providing a generic audit trail service for a plurality of business objects, at least two of the plurality of business objects being of different business object types. The method comprises receiving, at an application server, a notification of a change associated with at least one of the plurality of business objects, and requesting, in response to receiving the notification, auditing data from the at least one business object, the at least one business object implementing an auditable function set to interface with the application server. Further, the method includes receiving, through a called method of the auditable function set, the requested auditing data, and storing the received auditing data in a repository.

Embodiments consistent with yet another aspect of the invention include a computer-implemented method for accessing stored auditing data maintained by a generic audit trail service that provides the service to a plurality of business objects. The method comprises receiving a search request from a user, providing auditing data that matches the search request to the user, receiving a selection from the user of a subset of the provided auditing data for review by the user, providing, to at least one of the plurality of business objects associated with the selected subset, the associated auditing data, and requesting the at least one business object to display the selected auditing data.

It is to be understood that both the foregoing general description and the following detailed description are exemplary and explanatory only, and should not be considered restrictive of the scope of the invention. Further, features and/or variations may be provided in addition to those set forth herein. For example, embodiments of the invention may be directed to various combinations and sub-combinations of the features described in the detailed description.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments consistent with the invention and together with the description, serve to explain the principles of the invention. In the drawings.

DETAILED DESCRIPTION

Reference will now be made in detail to exemplary embodiments consistent with the invention, examples of which are illustrated in the accompanying drawings. Wherever possible, the same reference numbers will be used throughout the drawings to refer to the same or like parts.

The following detailed description refers to the accompanying drawings. While several exemplary embodiments and features of the invention are described herein, modifications, adaptations, and other implementations are possible, without departing from the spirit and scope of the invention. For example, substitutions, additions, or modifications may be made to the components illustrated in the drawings, and the exemplary methods described herein may be modified by substituting, reordering or, adding steps to the disclosed methods. Accordingly, the following detailed description does not limit the invention.

Embodiments consistent with the present invention are directed to systems, methods, and computer-readable media for providing generic audit trail services. Embodiments consistent with the invention may be implemented in various environments, including computer-based environments, such as personal computers, workstations, servers, laptops, personal digital assistants (PDAs), mobile phones, handheld devices, and other computing devices, workstation, networked and other computing-based environments with one or more users. Embodiments consistent with the present invention, however, is not limited to such examples and may be implemented with other platforms and in other environments.

By way of example, embodiments consistent with the invention may be implemented using conventional personal computers (PCs), desktops, hand-held devices, multiprocessor computers, pen computers, microprocessor-based or programmable consumer electronic devices, minicomputers, mainframe computers, personal mobile computing devices, mobile phones, portable or stationary personal computers, palmtop computers or the like.

The storage media referred to herein symbolize elements that temporarily or permanently store data and instructions. Although storage functions may be provided as part of a computer, memory functions can also be implemented in a network, processors (e.g., cache, register), or elsewhere. Various types of storage mediums can be used to implement features of the invention, such as a read-only memory (ROM), a random access memory (RAM), or a memory with other access options. Further, memory functions may be physically implemented by computer-readable media, such as, for example: (a) magnetic media, like a hard disk, a floppy disk, a magnetic disk, a tape, or a cassette tape; (b) optical media, like an optical disk (e.g., a CD-ROM), or a digital versatile disk (DVD); (c) semiconductor media, like DRAM, SRAM, EPROM, EEPROM, memory stick, and/or by any other media, like paper.

Embodiments consistent with the invention may also include computer program products that are stored in a computer-readable medium or transmitted using a carrier, such as an electronic carrier signal communicated across a network between computers or other devices. In addition to transmitting carrier signals, network environments may be provided to link or connect components in the disclosed systems. Networking environments are commonplace in offices, enterprise-wide computer networks, intranets and the Internet (i.e., the World Wide Web). The network may be a wired or a wireless network. To name a few network implementations, the network may be, for example, a local area network (LAN), a wide area network (WAN), a public switched telephone network (PSTN), an Integrated Services Digital Network (ISDN), an infrared (IR) link, a radio link, such as a Universal Mobile Telecommunications System (UMTS), Global System for Mobile Communication (GSM), Code Division Multiple Access (CDMA), or a satellite link.

Transmission protocols and data formats are also known, such as, for example transmission control protocol/internet protocol (TCP/IP), hyper text transfer protocol (HTTP), secure HTTP, wireless application protocol, unique resource locator (URL), unique resource identifier (URI), hyper text markup language (HTML), extensible markup language (XML), extensible hyper text markup language (XHTML), wireless application markup language (WML), Standard Generalized Markup Language (SGML), SOAP (simple object access protocol), etc. Such features may be utilized to implement embodiments consistent with the present invention, as disclosed herein.

Systems, methods, and computer-readable media, consistent with the present invention, may enable more robust and flexible auditing of BOs. Consequently, systems, methods, and computer readable media, consistent with the present invention, may log changes to BOs and allow access to such information as may be needed. More specifically, systems, methods, and computer readable media, consistent with the present invention, audit changes made to BOs and enable access to the data stored at a central repository by any person or machine that may require such access.

Figure 1:
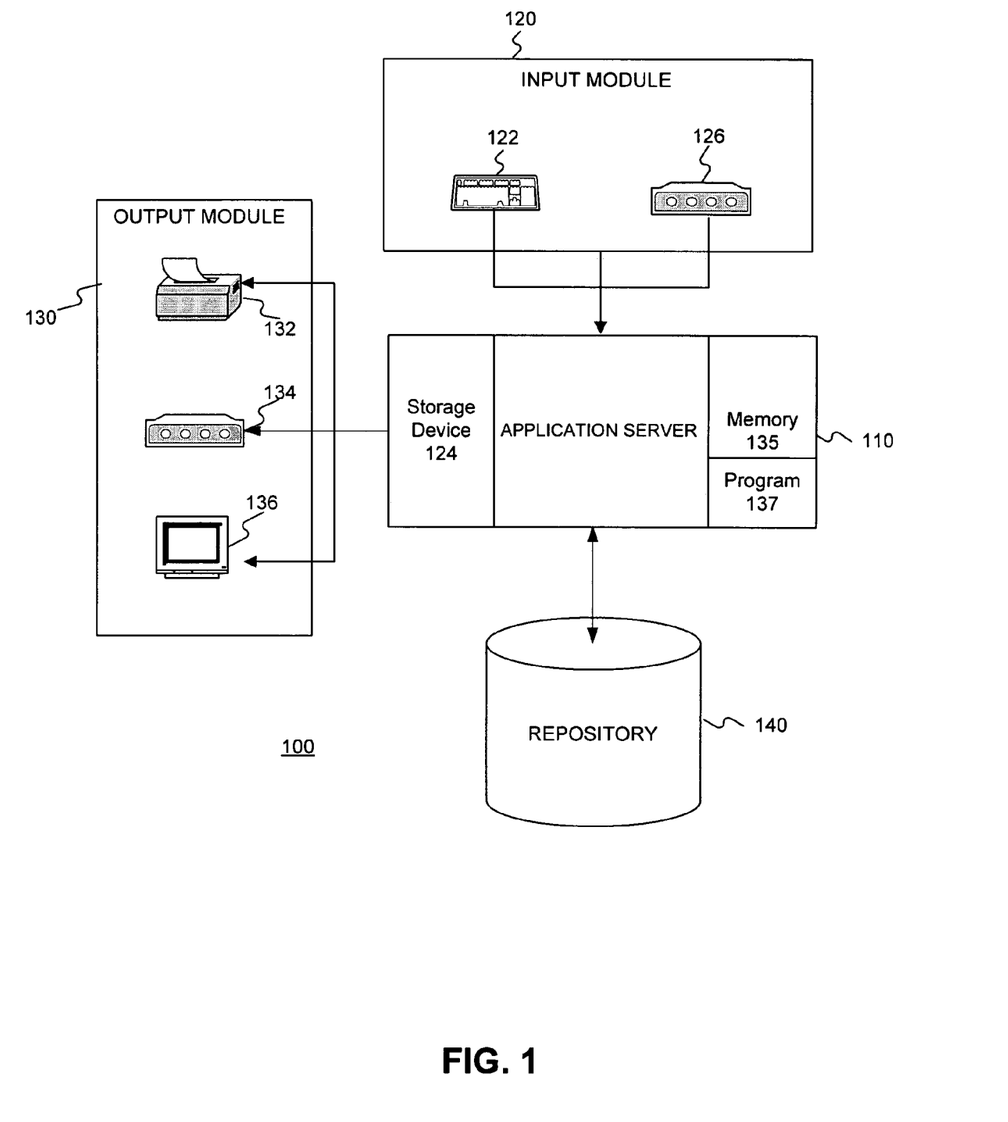
FIG. 1 illustrates an exemplary system environment in which features consistent with the present invention may be implemented.

FIG. 1 illustrates an exemplary system environment 100 in which embodiments consistent with the present invention may be implemented. As illustrated in FIG. 1, system 100 includes an application server 110, an input module 120, an output module 130, a memory 135, and a repository 140. Application server 110 is adapted to process input information received from input module 120. Application server 110 is further adapted to provide output information to output module 130. Additionally, application server 110 is adapted to access information in repository 140 for use in performing methods consistent with the present invention.

Application server 110 may comprise a general purpose computer (e.g., a personal computer, network computer, server, or mainframe computer) having a processor that may be selectively activated or reconfigured by a computer program to perform one or more methods consistent with the present invention. Application server 110 may also be implemented in a distributed network. Alternatively, application server 110 may be specially constructed for carrying-out methods consistent with the present invention.

Repository 140 may be implemented with any one of a number of commercially available repositories. However, in a preferred embodiment, the Enterprise Services Repository from SAP AG is used. Repository 140 may employ any of a number of commercially available database systems, such as Microsoft Access, dbase, Oracle, Sybase, etc.

Repository 140 may also store BOs that may be created using a data type definition consistent with the embodiments of the present invention. BOs stored in repository 140 may encapsulate their data and processes. External access to the BO data and processes may only be possible by means of specific methods. In at least one embodiment, the BOs may be accessed by means of Business Application Programming Interfaces (BAPI), a well-known and widely used application interface used to achieve interoperability between various systems and to integrate third party software components with the software offered by SAP AG. In another exemplary environment, such as one using an existing SAP NetWeaver architecture, the Enterprise Services Infrastructure (ESI) provides access to the BOs. Within the ESI, the implementer of the service may use the Service Provider Interface (SPI) to specify BOs and the end user may use, for example, the Generic Consumer Proxy (GCP) or Typed Consumer Proxy (TCP) of the ESF to access the business application. According to one embodiment of the present invention, application server 110 accesses BOs stored in repository 140.

Input module 120 may include an input device 122 and/or a network interface 126. Input device 122 may be implemented using a keyboard, mouse, speech recognition device, or data entering devices. Network interface 126 may receive information over any type of network (not shown), such as a telephony-based network (e.g., PBX or POTS), a local area network, a wide area network, a dedicated intranet, and/or the Internet. Application server 110 may also access data stored on storage device 124. Storage device 124 may include a memory, such as RAM or ROM memory that contains program instructions and/or data for performing one or more methods consistent with the present invention.

In maintaining repository 140, input module 120 may be used to request application server 110 to output information regarding the data stored in repository 140. Such requests may originate from, for example, an employee or network engineer via input device 122 or another computing system via network interface 126. Application server 110 may then output the requested information via output module 130.

Figure 2:
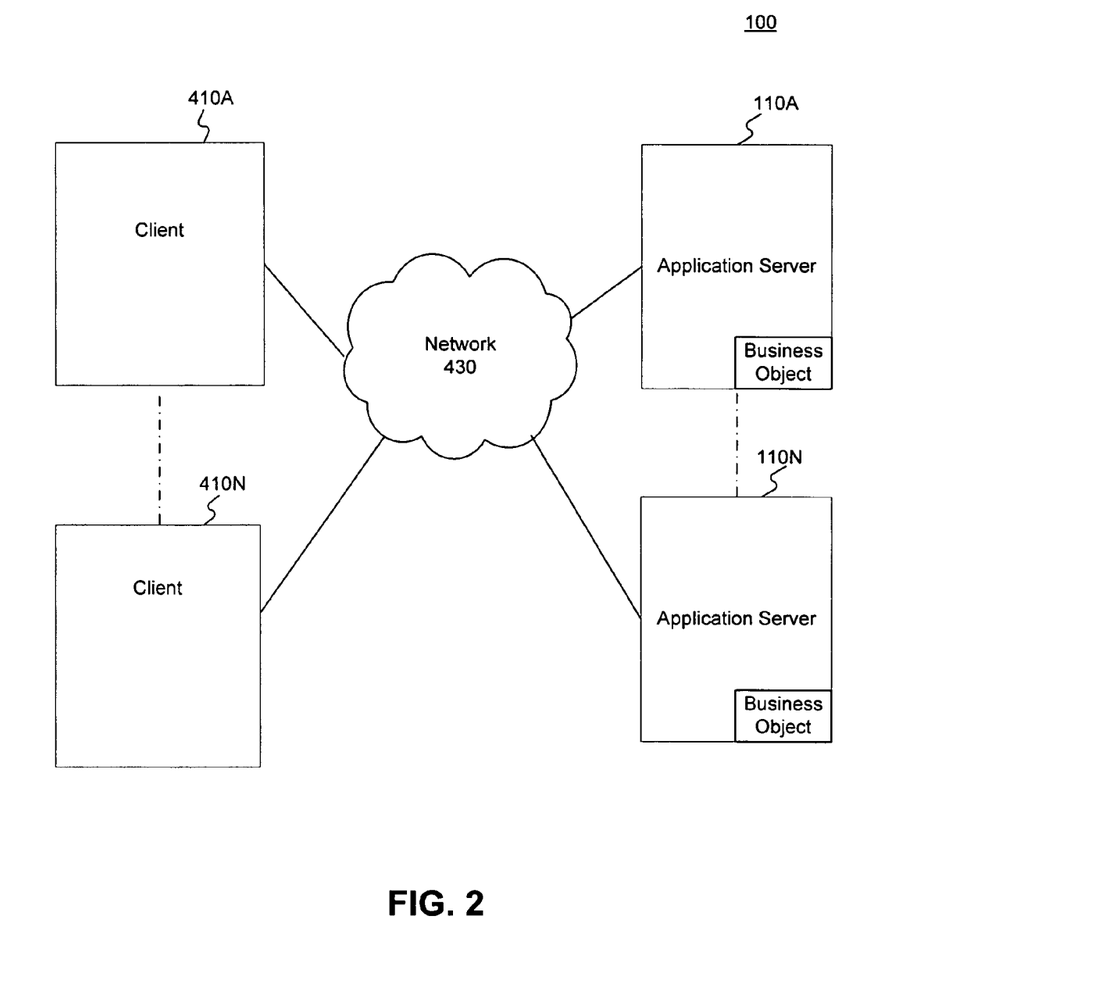
FIG. 2 illustrates a more detailed diagram of the exemplary system, consistent with an embodiment of the present invention.

Output module 130 may include a printer 132, an output interface 134, and/or a display 136. Printer 132 may be used to provide a printout of auditing data to interested parties. Output interface 134 may be used to provide the auditing data to the interested parties via the Internet, email, fax, or page, or may save the information on a computer readable medium. Display 136 may be used to provide the auditing data to the interested parties visually. Output interface 134 may also be used to request information regarding the BOs to be audited from other computing systems within a distributed system environment. For example, FIG. 2 illustrates a more detailed diagram of an exemplary system environment 100 consistent with embodiments of the present invention. As shown in FIG. 2, system 100 may comprise multiple computer systems, such as one or more application servers 110A-110N having BOs that are to be audited and a plurality of clients 410A-410N. These various components may be connected and communicate with one another through any suitable network 430, including the Internet. In a preferred embodiment, servers 110A-110N may use a model-view-controller architecture to provide access to the data stored in repository 140. For example, a model layer may handle data management, a controller layer may handle user input and event processing, and a view layer may handle the presentation. One skilled in the art would appreciate that a variety of other architectures and designs may be used.

Each of the clients 410A-410N may be implemented with a computing system used to perform tasks consistent with embodiments of the invention. Clients 410A-410N can be located in any location and may be managed and/or controlled by any user or application that uses BOs.

Figure 3:
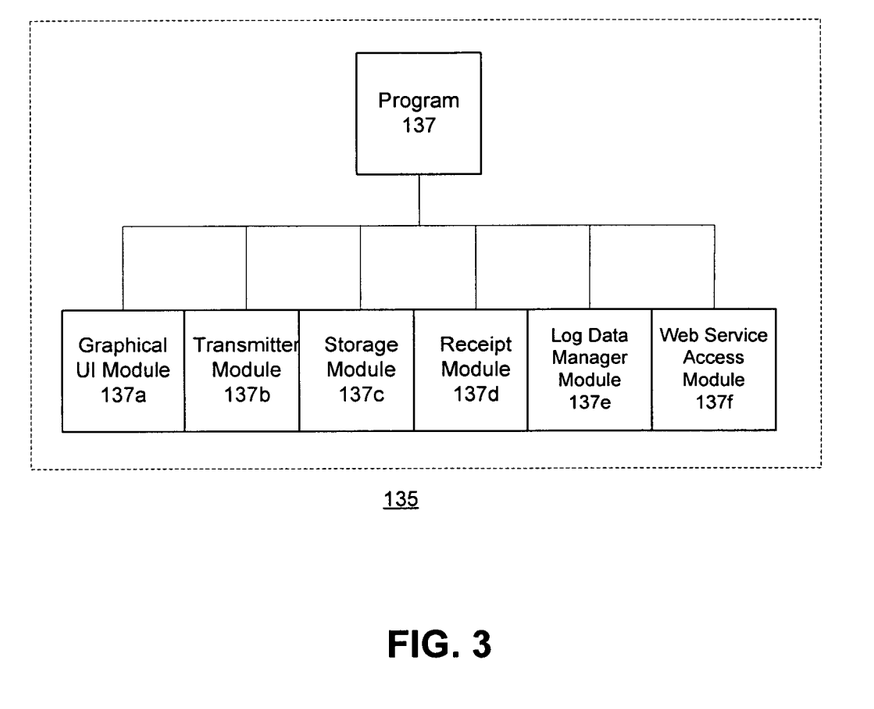
FIG. 3 is an exemplary software architecture for providing a generic audit trail device, consistent with an embodiment of the present invention.

FIG. 3 shows an exemplary software architecture for providing a generic audit trail device, consistent with an embodiment of the present invention. The software architecture may be stored in memory, such as memory 135 (cf. FIG. 1). In one embodiment, memory 135 stores instructions of program 137 which, when executed, perform the functions of system 100.

To perform auditing functions and provide other features consistent with the principles of the invention, program 137 may include instructions or programmed logic in the form of software modules 137a-137f. These software modules can be written using any known programming language, such as ABAP, XML, etc. A summary of each of these modules 137a-137f is provided below. As will be appreciated by those skilled in the art, the modules 137a-137f of FIG. 3 are merely examples and any number of modifications may be made, including combining, substituting, deleting or adding to or from the modules presented in this exemplary embodiment.

In the embodiment of FIG. 3, graphical UI module 137a may provide processing to display auditing data and generate other graphical UIs for a user or client. Transmitter module 137b can be used to request the transfer of auditing data, BO data, etc. from a client to application server 110. Storage module 137c can be used to save auditing data for persistent storage. Receipt module 137d receives auditing requests and transfers them to transmitter module 137b. In addition, Log Data Manager module 137e may be used to administer the persistency of the auditing data. Log Data Manager module 137e may also include an application program interface to provide data access. Further, Web Service Access module 137f may be used to provide access to the auditing data from remote locations. A skilled artisan will appreciate the listed software modules are exemplary only and any variation of modules including the addition of other modules can be used. A skilled artisan will also appreciate that program 137 may alternatively, or in addition to, be included in a separate BO stored in repository 140 or in a separate BO on a different computing system than the computing system maintaining the BOs to be audited.

In one embodiment, to perform auditing functions, program 137 may include instructions in the form of methods. These methods may be implemented as part of one or more modules (cf. FIG. 3) or as separate sets of computer-readable instructions. An exemplary list of methods that may be included in program 137 are shown below in Table 1. Program 137 may also include attributes, such as a trail stack, as shown below in Table 1. A skilled artisan will appreciate that program 137 is not limited to the exemplary list of methods and attributes and additional or fewer methods or attributes can be used.

TABLE 1

Generic Audit Trail Service

Figure 4:
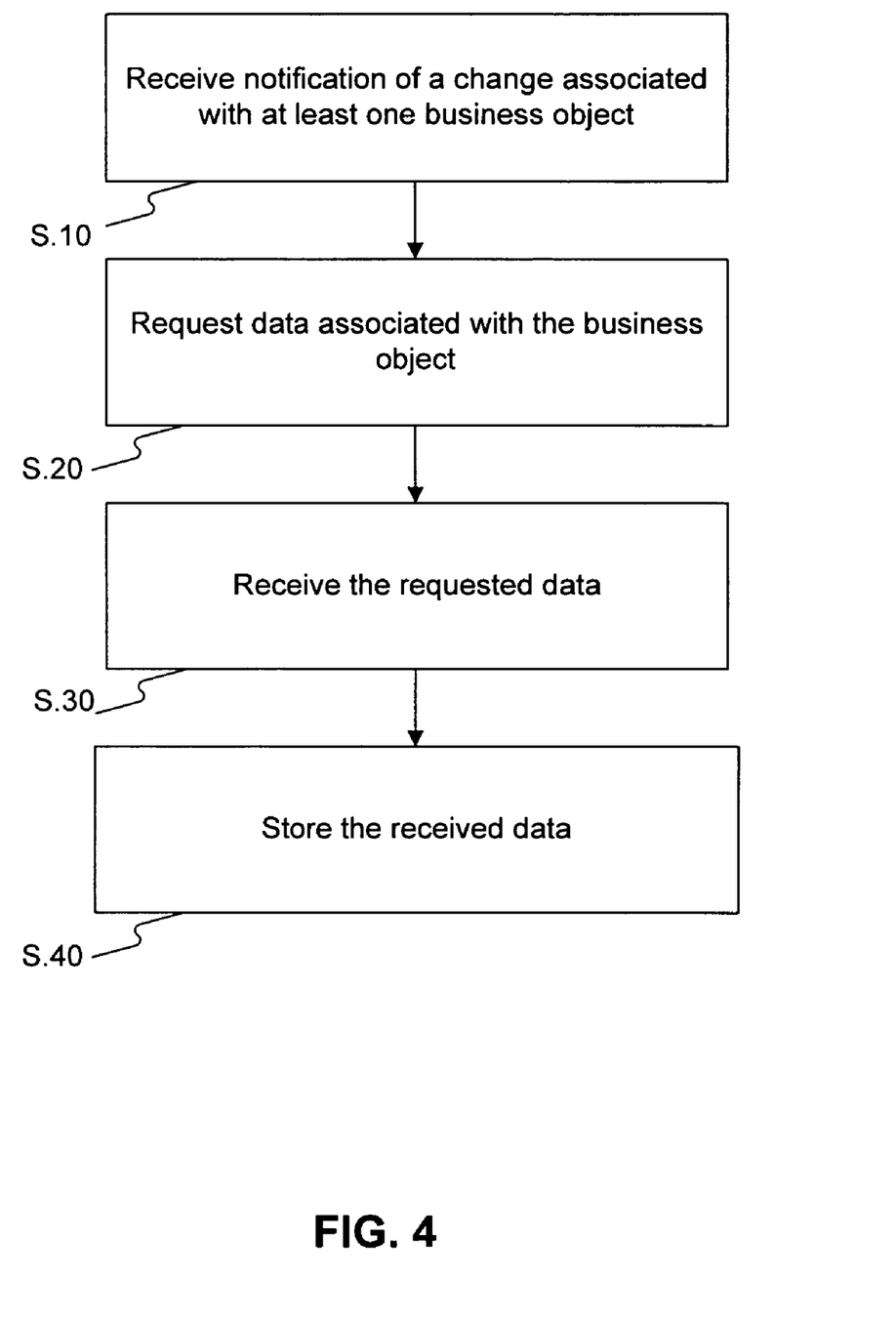
FIG. 4 is a flowchart of an exemplary method for providing a generic audit trail service, consistent with an embodiment of the present invention.

+handle_data_changed(in ChangedObject : IF_AUDITABLE_OBJECT)
+save_stack( )
+load_audit_trail(in SearchCondition)
+archive_audit_trail(in SearchCondition)
−TrailStack FIG. 4 illustrates a flowchart of an exemplary method for providing a generic auditing trail service, consistent with an embodiment of the present invention. The exemplary method of FIG. 4 may be implemented with program 137 (cf. FIG. 3) for providing a generic auditing trail service for distributed system environments, for example. Although the steps of the flowchart are described in a particular order, one skilled in the art will appreciate that these steps may be performed in a modified or different order. Further, one or more of the steps in FIG. 4 may be performed concurrently or in parallel. In addition, although the steps in the flowchart are described with reference to one client, a skilled artisan will appreciate that any number of clients could be used in embodiments consistent with the present embodiment.

As illustrated in FIG. 4, application server 110 first receives a notification of a change associated with at least one BO (Step S.10). For example, if a client application uses a "product" BO that includes dimensions, weight, standard price, global trade number, etc. associated with a product and the price of the product changes, then the client application could change the product BO and notify application server 110 of the change. Next, application server 110 requests information associated with the at least one BO (Step S.20). In one embodiment, the at least one BO may implement an auditable function set (see example discussed below) to interface with application server 110. Thereafter, application server 110 receives the requested data (Step S.30) and stores the received data (Step S.40).

Figure 5:
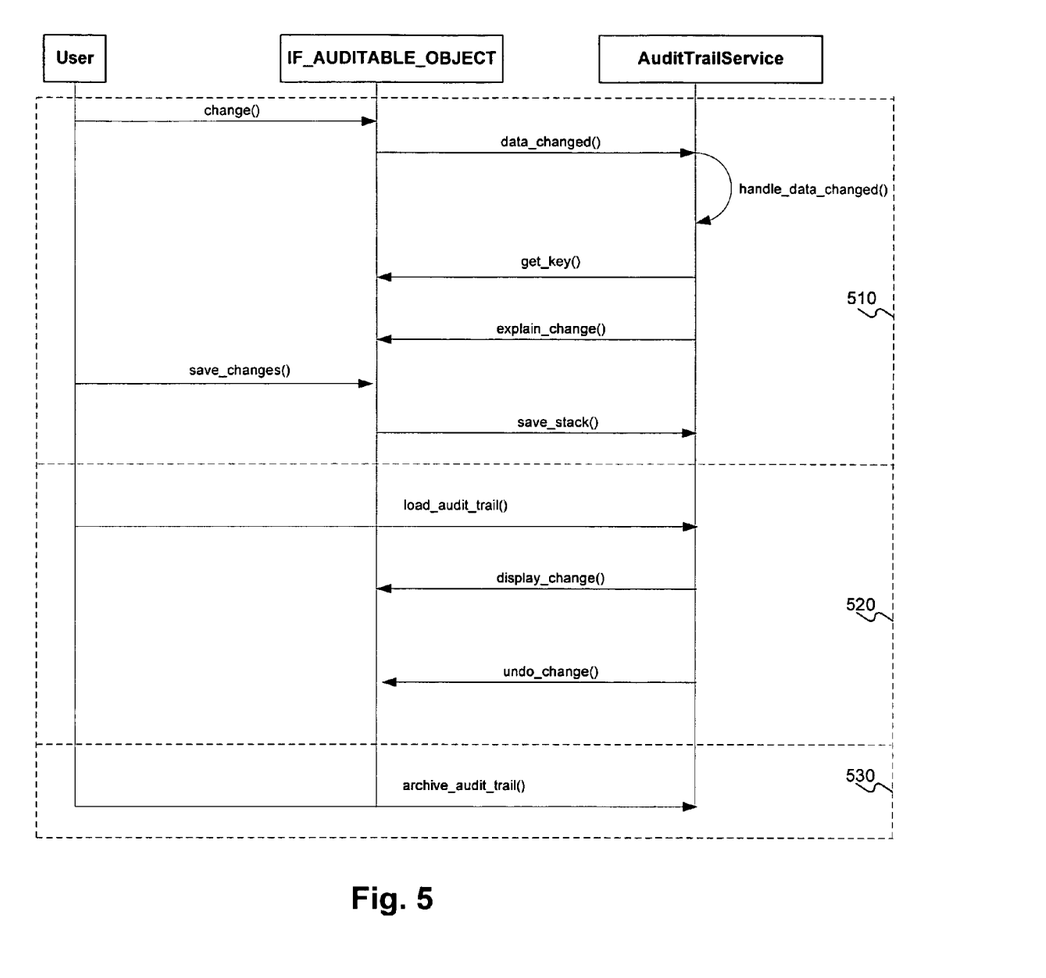
FIG. 5 is an exemplary interaction diagram for providing a generic audit trail service, consistent with an embodiment of the present invention.

FIG. 5 shows, by way of example, a more detailed diagram of an exemplary method for a generic auditing trail service and interaction between a user, a business object, and application server 110, consistent with embodiments of the present invention. For BOs to be able to use the generic audit trail service provided by application server 110, the BOs preferably implement methods that can be called by application server 110 (herein referred to as an "auditable function set"). An exemplary list of methods that can be included in the auditable function set are shown below in Table 2.

TABLE 2

Auditable Function-Set

+explain_change( ) : String
+get_key( ) : <unspecified>
+display_change(in ChangeDetail: String)
+undo_change (in ChangeDetail: String)

For instance, each BO that is configured to use the generic audit trail service can implement a "data_changed" event. The "data_changed" event can be used to notify application server 110 of any change associated with the BO by, for example, calling the "handle_data_changed" method as shown in Table 1 and FIG. 5. (cf. FIG. 4, Step S.10). For example, after a user modifies the price for a "product" BO and releases the change, for example by pressing <enter> or a confirmation button, the BO can notify application server 110 by invoking the "data_changed" event. A skilled artisan will appreciate that the notification of change can be prepared and sent to application server 110 for any kind of change to the BO. For example, the creation, deletion, destruction, etc. of a BO can all result in a notification of change being sent to application server 110.

Next, application server 110 requests information associated with the at least one BO. (cf. FIG. 4, Step S.20). As shown in the example of Table 2, each BO may implement a "get_key" function that can return data associated with the BO, such as a globally unique identifier (GUID), a timestamp of the change, an identity of the user who made the change, a business object type, etc. Application server 110 can call the "get_key" function for the at least one BO within the "handle_data_changed" method as shown in FIG. 5. Application server 110 also can request specific data regarding the changes that were made to the at least one BO as shown in FIG. 5. Each BO, as shown above in the example of Table 2, can also implement an "explain_change" function to provide application server 110 with a record of the changes that were made to the BO. For example, a "product" BO that had a price change may prepare a record showing this change and provide the record to application server 110. In one embodiment, the record may be prepared and stored in any format, such as XML, HTML, text, etc. Each BO may prepare the records using the same format or may each prepare them in different formats. In addition, a skilled artisan will appreciate that multiple changes may be stored in a single record. The following is one example of an XML record that may be created by a BO:

```
<events>
  <event type="dataChanged">
    <object id="123" />
    <text language="en">Field XYZ has been changed from value1 to
    value 2</text>
    <field name="XYZ">
      <old_value>Value1</old_value>
      <new_value>Value2</new_value>
    </field>
  </event>
</events>
```

This exemplary record indicates that an "XYZ" field of BO "123" has been changed from "Value1" to "Value 2."

Next, application server 110 receives the data (cf. FIG. 4, Step S.30) and stores the received data (cf. FIG. 4, Step S.40). Application server 110 may first store the received data in storage device 124. For example, application server 110 may store the received data in the audit trail stack. Application server 110 may then wait for a notification of commitment of the changes from the at least one BO. After receiving a notification of commitment of the changes from the at least one BO, application server 110 can store the received data associated with each BO in repository 140. For instance, after the user making changes to a BO saves the changes, application server 110 is notified and application server 110 stores the received data in repository 140. For example, the data can be stored in repository 140 as a persistence table that includes fields, such as, BO type, BO key, timestamp, changed by user, changes done, etc. However, if a notification of commitment of the changes is not received, then application server 110 may disregard or delete the received data. Application server 110 may implement this functionality in the "save_stack" method as shown in FIG. 5 and Table 1. In addition, to reduce the amount of data stored in repository 140, application server 110 can optionally archive the audited data when the data is no longer needed. For example, application server 110 can periodically, such as weekly, monthly, etc., archive all audited data that is older than a specified time stamp. For instance, every month, application server 110 can archive data older than three weeks. Alternatively, or in addition to, the client can request, as shown in FIG. 5, that certain of the audited data be archived. The client application can specify certain criteria and application server 110 can archive the data that meets the specified criteria. Application server can implement the archiving functionality by implementing the "archive_audit_trail" method as shown in Table 1.

Figure 6:
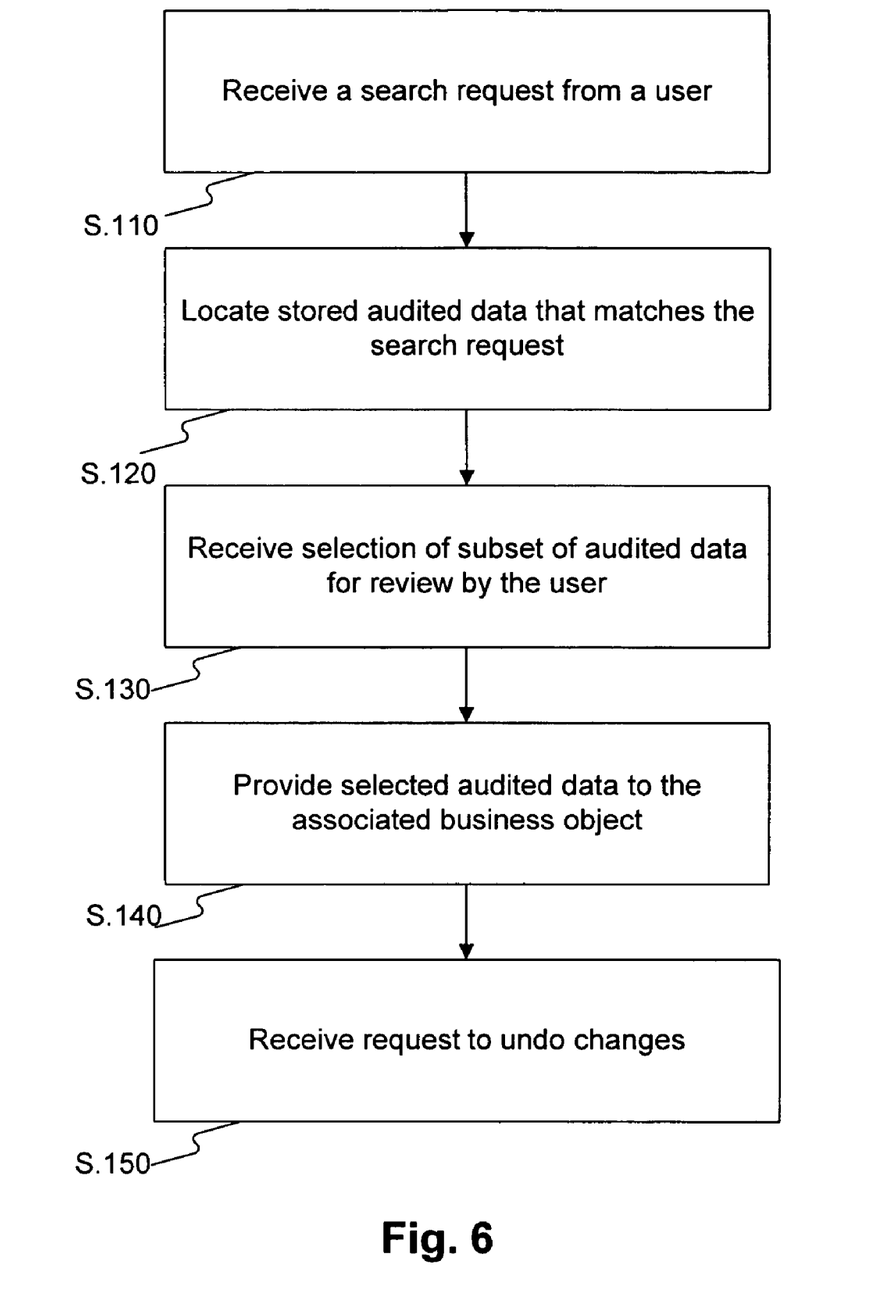
FIG. 6 is a flowchart of an exemplary method for accessing data maintained by a generic audit trail service, consistent with an embodiment of the present invention.

FIG. 6 illustrates an exemplary flowchart of a process for accessing the auditing data stored in repository 140 and maintained by application server 110, consistent with an embodiment of the present invention. Although the steps of the flowchart are described in a particular order, one skilled in the art will appreciate that these steps may be performed in a modified or different order. Further, one or more of the steps in FIG. 6 may be performed concurrently or in parallel. In addition, although the steps in the flowchart are described with reference to one client, a skilled artisan will appreciate that any number of clients could be used in embodiments consistent with the present embodiment.

First, application server 110 receives a search request from a user (Step S.110). The search request can include any search criteria desired by the user. For example, the search criteria may indicate a search for the audited data associated with a specific BO by business object type and key. Alternatively, or in addition to, the search criteria may specify a search for audited data associated with all BOs of a certain type and/or within certain time ranges. The search criteria may also specify a search for all changes done by a user. Application server 110 can then, by implementing the "load_audit_trail" method as shown in FIG. 5, locate all the data stored in repository 140 that meets the search criteria and present them to the user (Step S.120). The user can then, if desired, select from the presented data, a subset of the presented data that the user wants to review (Step S.130). Application server 110 then provides the selected audited data to the associated BO and requests the associated BO to display the changes by calling the "display_change" function as shown above in Table 2 and FIG. 5 (Step S.140). Each BO can be configured to display the audited data in any way that is desired. Each BO, having prepared the record of changes as discussed above, can be configured to interpret the received record of changes and display the changes in any way desired. In addition, if the user desires, the user can request application server 110 to undo the changes (Step S.150). If the user chooses to undo the changes, application server 110 can call the "undo_change" function, as shown above in Table 2 and FIG. 5, associated with the BO for which changes are to be undone. Each BO can create its own implementation for undoing changes and perform validation, consistency checks, etc. as desired.

As illustrated in FIG. 5 by the dashed line, in a preferred embodiment, the generic audit trail service may be separated into different activities. For example, as shown in FIG. 5, one activity may include the processing needed to store the audited data 510, another activity may include the processing to provide access to the stored auditing data 520, and another activity can be used to archive the audited data 530. A skilled artisan would appreciate that each or a subset of these activities may be processed in serial or in parallel. Further, a skilled artisan would also appreciate that the listed activities are exemplary only and any number and variety activities can be used Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for providing a generic audit trail service for a plurality of business objects, at least two of the plurality of business objects being of different business object types, the method comprising:
   receiving, at an application server, a notification of a change associated with at least one of the plurality of business objects;
   requesting, in response to receiving the notification, auditing data from the at least one business object, the at least one business object implementing an auditable function set to interface with the application server;
   receiving, through a called method of the auditable function set, the requested auditing data;
   storing the received auditing data in an audit trail stack;
   detecting a notification of commitment of the changes from the at least one business object;
   storing the received auditing data in a repository if the notification of commitment of the changes is received; and
   deleting the received auditing data if the notification of commitment of the changes is not received.

2. The method of claim 1, wherein the auditing data includes a record of the change along with at least one of a user who made the change, a time associated with the change, and an identifier of the associated business object.

3. The method of claim 2, wherein the record of the change is in at least one of an XML, HTML, and text format.

4. The method of claim 1, further comprising archiving the stored data when the data is no longer needed.

5. The method of claim 1, wherein the method for providing the generic audit trail service is implemented as a business object.

6. The method of claim 1, wherein the change associated with the at least one business object includes deletion or creation of the at least business object.

7. A computer-hardware system for providing a generic audit trail service for a plurality of business objects, at least two of the plurality of business objects being of different business object types, the system comprising:
   means for receiving, at an application server, a notification of a change associated with at least one of the plurality of business objects;
   means for requesting, in response to receiving the notification, auditing data from the at least one business object, the at least one business object implementing an auditable function set to interface with the application server;
   means for receiving, through a called method of the auditable function set, the requested auditing data;
   means for storing the received auditing data in an audit trail stack;
   means for detecting a notification of commitment of the changes from the at least one business object;
   means for storing the received auditing data in a repository if the notification of commitment of the changes is received; and
   means for deleting the received auditing data if the notification of commitment of the changes is not received.

8. The system of claim 7, wherein the auditing data includes a record of the change along with at least one of a user who made the change, a time associated with the change, and an identifier of the associated business object.

9. The system of claim 8, wherein the record of the change is in at least one of an XML, HTML, and text format.

10. The system of claim 7, further comprising archiving the stored data when the data is no longer needed.

11. The system of claim 7, wherein the method for providing the generic audit trail service is implemented as a business object.

12. The system of claim 7, wherein the change associated with the at least one business object includes deletion or creation of the at least one business object.

13. A computer program product, tangibly embodied in a computer-readable storage medium, for providing a generic audit trail service for a plurality of business objects, at least two of the plurality of business objects being of different business object types, the computer program product comprising program means for performing, when executed by a processor, the steps of:
   receiving, at an application server, a notification of a change associated with at least one of the plurality of business objects;
   requesting, in response to receiving the notification, auditing data from the at least one business object, the at least one business object implementing an auditable function set to interface with the application server;
   receiving, through a called method of the auditable function set, the requested auditing data;
   storing the received auditing data in an audit trail stack;
   detecting a notification of commitment of the changes from the at least one business object,
   storing the received auditing data in a repository if the notification of commitment of the changes is received; and
   deleting the received auditing data if the notification of commitment of the changes is not received.

14. The computer program product of claim 13, wherein the auditing data includes a record of the change along with at least one of a user who made the change, a time associated with the change, and an identifier of the associated business object.

15. The computer program product of claim 14, wherein the record of the change is in at least one of an XML, HTML, and text format.

16. The computer program product of claim 13, further comprising archiving the stored data when the data is no longer needed.

17. The computer program product of claim 13, wherein the method for providing the generic audit trail service is implemented as a business object.

18. The computer program product of claim 13, wherein the change associated with the at least one business object includes deletion or creation of the at least one business object.

* * * * *